United States Patent
Tsuchizawa et al.

(10) Patent No.: US 10,421,519 B2
(45) Date of Patent: Sep. 24, 2019

(54) BICYCLE CONTROLLER

(71) Applicant: Shimano Inc., Sakai, Osaka (JP)

(72) Inventors: Yasuhiro Tsuchizawa, Osaka (JP); Hiroshi Matsuda, Osaka (JP); Kazuhiro Fujii, Osaka (JP); Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 75 days.

(21) Appl. No.: 15/620,184

(22) Filed: Jun. 12, 2017

(65) Prior Publication Data

US 2017/0355420 A1 Dec. 14, 2017

(30) Foreign Application Priority Data

Jun. 14, 2016 (JP) .................................. 2016-118306

(51) Int. Cl.
*B62M 6/50* (2010.01)
*B62M 6/45* (2010.01)

(52) U.S. Cl.
CPC ................ *B62M 6/50* (2013.01); *B62M 6/45* (2013.01); *B62K 2207/04* (2013.01)

(58) Field of Classification Search
CPC ........ B62M 6/50; B62M 6/45; B62K 2207/04
USPC ......................................................... 701/22
See application file for complete search history.

(56) References Cited

U.S. PATENT DOCUMENTS

| | | | | |
|---|---|---|---|---|
| 5,971,090 A | * | 10/1999 | Tanaka ................ | B60L 11/1801 180/206.2 |
| 2002/0120382 A1 | * | 8/2002 | Hatanaka ............ | B60L 11/1803 701/70 |
| 2015/0307157 A1 | | 10/2015 | Gao | |

FOREIGN PATENT DOCUMENTS

| CN | 105035246 A | 11/2015 |
|---|---|---|
| JP | 6-272486 A | 9/1994 |
| JP | 9-272486 A | 10/1997 |
| JP | 3974974 B2 | 9/2007 |
| JP | 2015-209159 A | 11/2015 |
| TW | M518767 U | 3/2016 |
| TW | 201615482 A | 5/2016 |

* cited by examiner

*Primary Examiner* — Brian P Sweeney
(74) *Attorney, Agent, or Firm* — Global IP Counselors, LLP

(57) ABSTRACT

A bicycle controller includes an electronic control unit controlling output of a motor that assists in propelling of a bicycle based on a manual driving force input to the bicycle. The electronic control unit further configured to control the motor in any one of operation modes including first, second and another operation modes, which control the output of the motor based on the manual driving force. The other operation mode excludes the first and second operation modes. In the first operation mode, the upper limit of output torque of the motor is a first value. In the second operation mode, the upper limit of output torque of the motor is a second value, which is 1.5 times or more than the first value. In the other operation mode, the upper limit of the output torque of the motor is the first value or less, or the second value or greater.

22 Claims, 4 Drawing Sheets

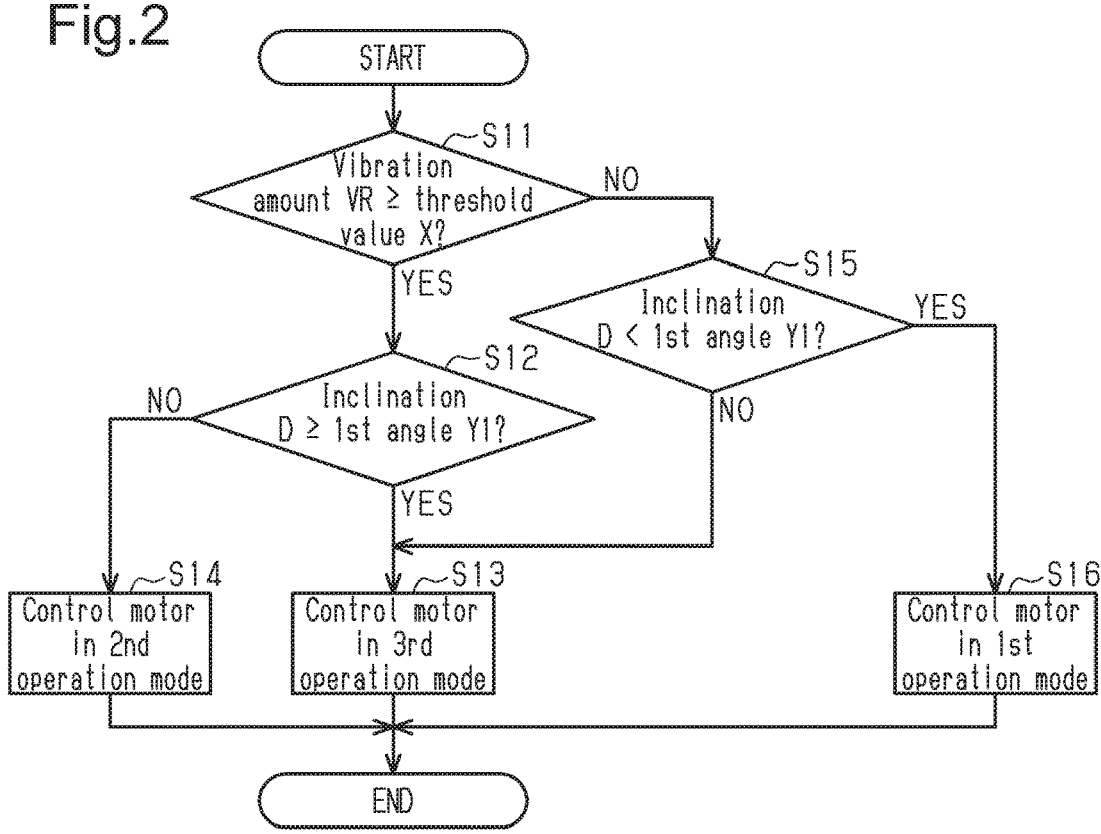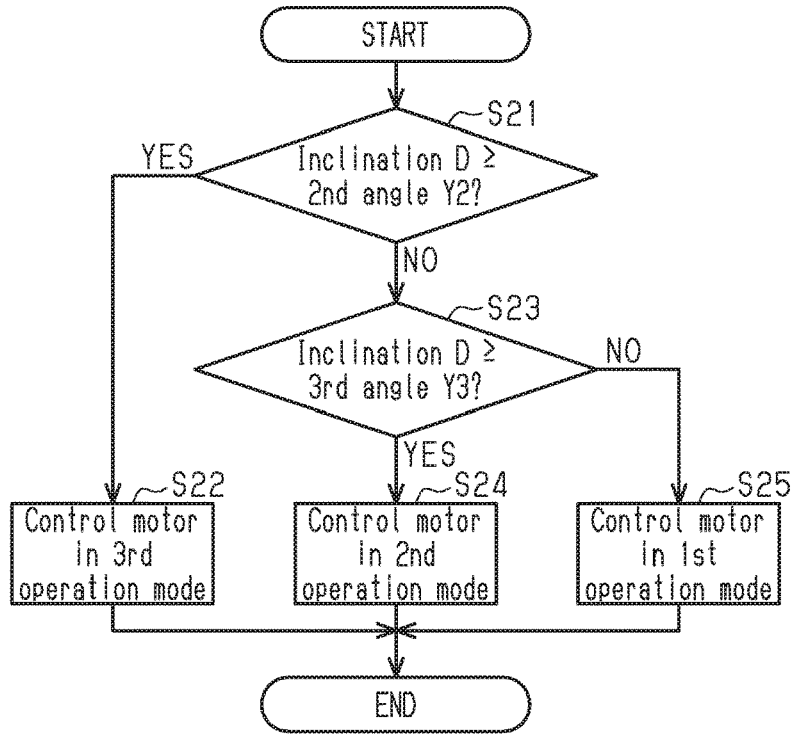

BICYCLE CONTROLLER

CROSS-REFERENCE TO RELATED APPLICATIONS

This application claims priority to Japanese Patent Application No. 2016-118306, filed on Jun. 14, 2016. The entire disclosure of Japanese Patent Application No. 2016-118306 is hereby incorporated herein by reference.

BACKGROUND

Field of the Invention

The present invention generally relates to a bicycle controller.

Background Information

Japanese Laid-Open Patent Publication No. 10-67377 (Patent document 1) discloses a bicycle controller that further configured to control the output of a motor in accordance with manual driving force. The bicycle controller uses different assist ratios of driving power of the motor to a manual driving force, and is capable of switching the assist ratios.

SUMMARY

It is preferable to switch operation modes that control the motor in accordance with the riding environment of the bicycle. However, the prior art only discloses a bicycle controller that changes the assist ratio.

One object of the present invention is to provide a bicycle controller that assists in propelling of a bicycle in accordance with the riding environment of a bicycle in a further appropriate manner.

(1) In accordance with a first aspect of the present invention, a bicycle controller includes an electronic control unit that further configured to control an output of a motor that assists in propelling of a bicycle based on a manual driving force that is input to the bicycle. The electronic control unit is further configured to control the motor in any one of a plurality of operation modes that includes a first operation mode, a second operation mode and another operation mode. The first and second operation modes control the output of the motor based on the manual driving force. The another operation mode excludes the first and second operation modes. In the first operation mode, the electronic control unit is further configured to set a first upper limit value of an output torque of the motor. In the second operation mode, the electronic control unit is further configured to set a second upper limit value of the output torque of the motor, which is 1.5 times or more than the first upper limit value. In the other operation mode, the electronic control unit is further configured to set a third upper limit value of the output torque of the motor to one of the first upper limit value or less, and the second upper limit value or greater. With the bicycle controller according to the first aspect, the upper limit value of the output torque of the motor in the second operation mode is 1.5 times or more than the upper limit value of the output torque of the motor in the first operation mode. Thus, the output torque of the motor is not likely to reach the upper limit value in the second operation mode as compared to in the first operation mode even in a state where larger manual driving force is input. This limits changes in the ratio of manual driving force to the output torque of the motor. Consequently, propelling of the bicycle is assisted in a further appropriate manner.

(2) In accordance with a second aspect of the present invention, the bicycle controller according to the first aspect is configured so that the second upper limit value is 2 times or more than the first upper limit value. This further limits changes in the ratio of manual driving force to the output torque of the motor. With the bicycle controller according to the second aspect, propelling of the bicycle is assisted in a further appropriate manner.

(3) In accordance with a third aspect of the present invention, the bicycle controller according to first or second aspects is configured so that in the first operation mode, the electronic control unit further configured to control the motor to obtain a first assist ratio in a state where the output torque of the motor is less than or equal to the first upper limit value, and in the second operation mode, the electronic control unit further configured to control the motor to obtain a second assist ratio in a state where the output torque of the motor is less than or equal to the second upper limit value. With the bicycle controller according to the third aspect, different assist ratios are used in each of the operation modes. Consequently, propelling of the bicycle is assisted in a further appropriate manner.

(4) In accordance with a fourth aspect of the present invention, the bicycle controller according to third aspects is configured so that the second assist ratio is 2 times or less than the first assist ratio. With the bicycle controller according to the fourth aspect, even in a case that the assist ratio of the second operation mode is greater than the assist ratio of the first operation mode, the second assist ratio is set to be 2 times or less than the first assist ratio. This limits changes in the ratio of manual driving force to the output torque of the motor. Consequently, propelling of the bicycle is assisted in a further appropriate manner.

(5) In accordance with a fifth aspect of the present invention, the bicycle controller according to third or fourth aspects is configured so that in the other operation mode the electronic control unit is further configured to set the other operation as a third operation mode in which the third upper limit value of the output torque of the motor to be greater than or equal to the second upper limit value. Also, in the third operation mode, the electronic control unit further configured to control the motor to obtain a third assist ratio in a state where the output torque of the motor is less than or equal to the third upper limit value. The third assist ratio is greater than the second assist ratio of the second operation mode. Further, a difference between the third upper limit value and the second upper limit value is less than a difference between the second upper limit value and the first upper limit value. With the bicycle controller according to the fifth aspect, the first operation mode, the second operation mode, and the third operation mode are selected in accordance with the riding environment. Thus, propelling of the bicycle is assisted in a further appropriate manner. Particularly, in the second operation mode, changes in the ratio of manual driving force to the output torque of the motor are limited.

(6) In accordance with a sixth aspect of the present invention, the bicycle controller according to fifth aspects is configured so that the third assist ratio is 2 times or more than the second assist ratio. With the bicycle controller according to the sixth aspect, in the third operation mode, propelling of the bicycle is assisted with larger power.

(7) In accordance with a seventh aspect of the present invention, the bicycle controller according to fifth or sixth aspects is configured so that the third upper limit value is equal to the second upper limit value. With the bicycle controller according to the seventh aspect, it is hard to change the ratio of manual driving force to the output torque of the motor in the second operation mode. Consequently, propelling of the bicycle is assisted in a further appropriate manner.

(8) In accordance with an eighth aspect of the present invention, a bicycle controller includes an electronic control unit that further configured to control output of a motor that assists in propelling of a bicycle based on a manual driving force that is input to the bicycle. The electronic control unit is further configured to control the motor in any one of operation modes including a first operation mode, a second operation mode and a third operation mode. The electronic control unit is further configured to set an increase rate of an assist ratio in a state where the first operation mode is switched to the second operation mode to be less than an increase rate of an assist ratio in a state where the second operation mode is switched to the third operation mode. Also, the electronic control unit is further configured to set an increase rate of an upper limit value of an output torque of the motor in a state where the first operation mode is switched to the second operation mode to be greater than an increase rate of an upper limit value of the output torque of the motor in a state where the second operation mode is switched to the third operation mode. With the bicycle controller according to the eighth aspect, it is hard to change the ratio of manual driving force to the output torque of the motor in the second operation mode. Consequently, propelling of the bicycle is assisted in a further appropriate manner. Additionally, the motor assists with a different power level in each operation mode. Thus, the assist can be easily performed in accordance with the riding environment.

(9) In accordance with a ninth aspect of the present invention, the bicycle controller according to the eighth aspect is configured so that the assist ratio of the second operation mode is 2 times more than the assist ratio of the first operation mode. With the bicycle controller according to the ninth aspect, even in a case that the assist ratio of the second operation mode is greater than the assist ratio of the first operation mode, the second assist ratio is set to be 2 times or less than the first assist ratio. This limits changes in the ratio of manual driving force to the output torque of the motor. Consequently, propelling of the bicycle is assisted in a further appropriate manner.

(10) In accordance with a tenth aspect of the present invention, the bicycle controller according to the eighth or ninth aspect is configured so that the upper limit value of the output torque of the motor in the second operation mode is 2 times or more than the upper limit value of the output torque of the motor in the first operation mode. With the bicycle controller according to the tenth aspect, the output torque of the motor is not likely to reach the upper limit value in the second operation mode as compared to in the first operation mode even in a state where greater manual driving force is input. This limits changes in the ratio of manual driving force to the output torque of the motor. Consequently, propelling of the bicycle is assisted in a further appropriate manner.

(11) In accordance with an eleventh aspect of the present invention, the bicycle controller according to any one of the first to tenth aspects is configured so that the electronic unit is further configured to change the operation modes based on an operation of a bicycle operation unit that is operable by a user. With the bicycle controller according to the eleventh aspect, the user is allowable to change the operation modes and facilitates obtainment of assist power that is preferred by the user.

(12) In accordance with a twelfth aspect of the present invention, the bicycle controller according to any one of the first to tenth aspects is configured so that the electronic control unit is further configured to switch the operation modes based on at least one of an inclination of the bicycle and a vibration of the bicycle. With the bicycle controller according to the twelfth aspect, the electronic control unit further configured to control the motor in accordance with the riding environment. Thus, the assist can be easily performed in accordance with the riding environment.

(13) In accordance with a thirteenth aspect of the present invention, the bicycle controller according to the twelfth aspect is configured so that the electronic control unit is further configured to control the motor in the first operation mode in a state where the inclination is less than a first angle and an amount of the vibration is less than a threshold value. With the bicycle controller according to the thirteenth aspect, in a state where the inclination is less than the first angle and the vibration amount is less than the threshold value, the output of the motor is limited. This reduces power consumed by the motor.

(14) In accordance with a fourteenth aspect of the present invention, the bicycle controller according to the twelfth or thirteenth aspect is configured so that the electronic control unit is further configured to control the motor in the second operation mode in a state where the inclination angle is less than a first angle and an amount of the vibration is greater than or equal to a threshold value. With the bicycle controller according to the fourteenth aspect, in a state where the inclination is less than the first angle and the vibration amount is greater than or equal to the threshold value, the output of the motor is greater than that in the first operation mode. Thus, propelling of the bicycle is assisted with larger power.

(15) In accordance with a fifteenth aspect of the present invention, the bicycle controller according to any one of the twelfth to fourteenth aspects depending on any one of the fifth to tenth aspects is configured so that the electronic control unit is further configured to control the motor in the third operation mode in a state where the inclination is greater than or equal to a first angle. With the bicycle controller according to the fifteenth aspect, in a state where the inclination angle is greater than or equal to the first angle, the output of the motor is greater than that in the first operation mode and the second operation mode. Thus, propelling of the bicycle is assisted with further larger power.

(16) In accordance with a sixteenth aspect of the present invention, the bicycle controller according to any one of the fifth to tenth aspects is configured so that the electronic control unit is further configured to control the motor in the third operation mode in a state where an inclination of the bicycle is greater than or equal to a second angle. The electronic control unit is further configured to control the motor in the second operation mode in a state where the inclination is greater than or equal to a third angle, which is smaller than the second angle, and less than the second angle. The electronic control unit is further configured to control the motor in the first operation mode in a state where the inclination is less than the third angle. With the bicycle controller according to the sixteenth aspect, propelling of the bicycle is appropriately assisted in accordance with the inclination of the bicycle.

(17) In accordance with a seventeenth aspect of the present invention, the bicycle controller according to any one of the fifth to tenth aspects is configured so that the electronic control unit is further configured to control the motor in the third operation mode in a state where an inclination of the bicycle is greater than or equal to a fourth angle. The electronic control unit is further configured to control the motor in the second operation mode in a state where the inclination is less than the fourth angle. With the bicycle controller according to the seventeenth aspect, propelling of the bicycle is appropriately assisted in accordance with the inclination of the bicycle.

(18) In accordance with an eighteenth aspect of the present invention, the bicycle controller according to the seventeenth aspect is configured so that the electronic control unit is further configured to switch the operation modes to the first operation mode based on an operation of an operation unit that is operable by a user. With the bicycle controller according to the eighteenth aspect, the operation mode can be changed to the first operation mode by an operation performed by the user regardless of the inclination of the bicycle. This reduces power consumed by the motor.

(19) In accordance with a nineteenth aspect of the present invention, the bicycle controller according to the twelfth aspect is configured so that the electronic control unit is further configured to control the motor in the second operation mode in a state where an amount of vibration of the bicycle is greater than or equal to a threshold value. The electronic control unit is further configured to control the motor in the first operation mode in a state where the amount of the vibration is less than the threshold value. With the bicycle controller according to the nineteenth aspect, propelling of the bicycle is appropriately assisted in accordance with the vibration amount of the bicycle.

(20) In accordance with a twentieth aspect of the present invention, the bicycle controller according to the nineteenth aspect depending on any of the fifth to tenth aspects is configured so that the electronic control unit is further configured to switch the operation modes to the third operation mode based on an operation of an operation unit that is operable by a user. With the bicycle controller according to the twentieth aspect, the operation mode can be changed to the third operation mode by an operation performed by the user regardless of the vibration amount of the bicycle. Thus, the assist power is increased in accordance with the intension of the user.

(21) In accordance with a twenty-first aspect of the present invention, the bicycle controller according to any one of the twelfth to eighteenth aspects is configured so that the electronic control unit is further configured to obtain information related to the inclination from an inclination sensor that detects an inclination of the bicycle in a front-rear direction. With the bicycle controller according to the twenty-first aspect, the inclination is obtained with high accuracy.

(22) In accordance with a twenty-second aspect of the present invention, the bicycle controller according to any one of the twelfth to fifteenth, nineteenth, and twentieth aspects is configured so that the electronic control unit is further configured to obtain information related to an amount of the vibration from a vibration sensor that detects vibration of the bicycle. With the bicycle controller according to the twenty-second aspect, the vibration amount of the bicycle is obtained by the vibration sensor with high accuracy.

Accordingly, the bicycle controller assists in propelling of the bicycle in accordance with the riding environment of the bicycle in a further appropriate manner.

BRIEF DESCRIPTION OF THE DRAWINGS

Referring now to the attached drawings which form a part of this original disclosure.

FIG. 2 is a flowchart of a switching process executed by an electronic control unit of FIG. 1.

FIG. 3 is a flowchart of a switching process executed by a first modified example of an electronic control unit.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
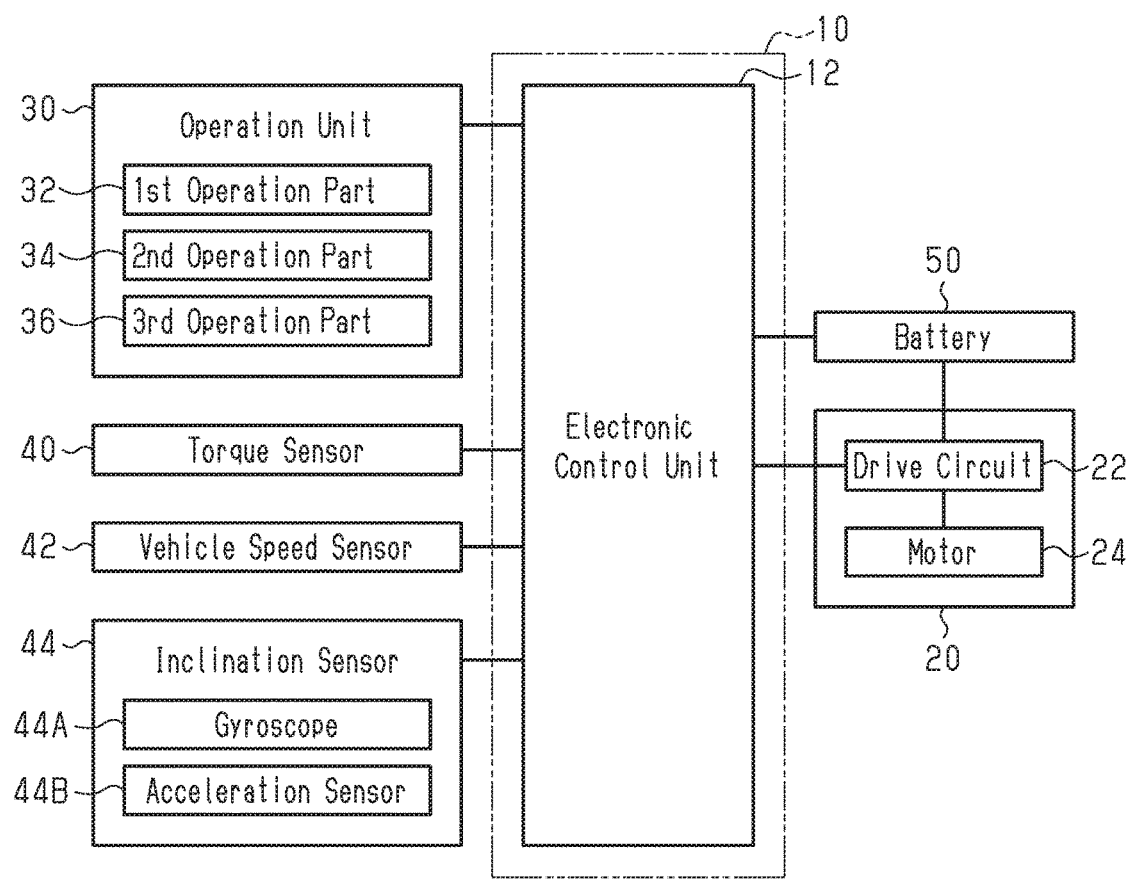
FIG. 1 is a block diagram showing an electric configuration of a bicycle that includes one embodiment of a bicycle controller.

One embodiment of a bicycle controller will now be described with reference to FIGS. 1 and 2. As shown in FIG. 1, a bicycle controller 10 includes an electronic control unit 12. The bicycle controller 10 is mounted on a bicycle. The bicycle also includes a drive unit 20, a bicycle operation unit 30, a torque sensor 40, a vehicle speed sensor 42, an inclination sensor 44 and a battery 50. The electronic control unit 12 is connected to and capable of performing wired or wireless communication with a drive circuit 22 of the drive unit 20, the operation unit 30, the torque sensor 40, the vehicle speed sensor 42 and the inclination sensor 44. The battery 50 is electrically connected to the electronic control unit 12 and the drive circuit 22. In a case that the electronic control unit 12 is connected to the operation unit 30, the torque sensor 40, the vehicle speed sensor 42, and the inclination sensor 44 by wires. Electric power can be supplied to the operation unit 30, the torque sensor 40, the vehicle speed sensor 42, and the inclination sensor 44 from the electronic control unit 12 or directly from the battery 50. In a case that the electronic control unit 12 is connected to the operation unit 30, the torque sensor 40, the vehicle speed sensor 42, and the inclination sensor 44 through wireless communication, the operation unit 30, the torque sensor 40, the vehicle speed sensor 42, and the inclination sensor 44 each include a power supply. The power supply is, for example, a rechargeable battery or an electric generator.

The drive unit 20 includes a motor 24 that assists in propelling of the bicycle. The electronic control unit 12 further configured to control the output of the motor 24 based on the manual driving force that is input to the bicycle. The electronic control unit 12 further configured to control the motor 24 in any one of operation modes. The operation modes differ from one another in the output state of the motor 24 that is based on the manual driving force. The electronic control unit 12 includes an arithmetic processor and a memory. The arithmetic processor, which executes predetermined control programs, includes, for example, a central processing unit (CPU) or a micro processing unit (MPU). The memory stores information used in various kinds of control programs, the operation modes and various kinds of control processes. The memory can be arranged separately from the electronic control unit 12. The electronic control unit 12 can be arranged in the drive unit 20 or the operation unit 30. Alternatively, the electronic control unit 12 can be arranged separately from the drive unit 20 and the operation unit 30. The electronic control unit 12 can include one or more arithmetic processors and one or more memory devices. For example, in a case that the electronic control unit 12 includes a plurality of arithmetic processors and a plurality of memory devices. Also, each of the drive unit 20 and the operation unit 30 can also include one or more arithmetic processors and one or more memory devices that are similar to those of the electronic control unit 12. The electronic control unit 12 can include general circuits such as an input interface circuit and an output interface circuit.

The drive unit 20 includes the drive circuit 22 and the motor 24. The drive circuit 22 further configured to control electric power supplied to the motor 24 from the battery 50, which is mounted on the bicycle. The motor 24 assists in propelling of the bicycle. The motor 24 assists manual driving force that is input to the bicycle. The motor 24 includes an electric motor. The motor 24 is connected to a power transmission path that extends from a crank axle to a rear sprocket of the bicycle. Preferably, the motor 24 is connected to a power transmission path that extends from the crank axle to a front sprocket. The drive unit 20 can include a reduction gear that reduces the speed of rotation of the motor 24. The drive unit 20 can be included in a front hub or a rear hub, in this case, the motor 24 is connected to a hub shell of the front hub or the rear hub.

The operation unit 30 is coupled to a handlebar. The operation unit 30 includes a first operation part 32 and a second operation part 34. The first operation part 32 and the second operation part 34 each include a switch or a lever. For example, the operation unit 30 is a hand operated shifter or a hand operated bicycle component operating device that includes one or more switches and/or one or more levers. The electronic control unit 12 changes the operation mode based on an operation of the operation unit 30 that is operable by the user. The first operation part 32 and the second operation part 34 are arranged so that the operation modes are manually switched. In a case that the user operates the first operation part 32 or the second operation part 34, the operation unit 30 transmits a switching signal to the electronic control unit 12 for switching the operation modes from one operation mode to another operation mode. The first operation part 32 is arranged so that the operation modes are switched in a first sequence. The second operation part 34 is arranged so that the operation modes are switched in a second sequence that is reverse to the first sequence. The operation unit 30 further includes a third operation part 36. The third operation part 36 includes a switch or a lever. In a case that the user operates the third operation part 36, the electronic control unit 12 changes the operation mode between a manual mode, which manually changes the operation modes, and an automatic mode, which automatically changes the operation modes. The operation unit 30 can separately provide the electronic control unit 12 that produces a signal for manually changing the operation modes and a signal for automatically changing the operation modes. Alternatively, in a state where the electronic control unit 12 receives a signal corresponding to the operation of the third operation part 36, the operation unit 30 can alternately switch between the manual mode and the automatic mode.

The torque sensor 40 outputs a signal in accordance with a manual driving force. The torque sensor 40 is configured to detect the manual driving force that is applied to cranks or pedals. The torque sensor 40 includes, for example, at least one of a strain sensor, a magnetostrictive sensor, an optical sensor and a pressure sensor. The electronic control unit 12 calculates the manual driving force per unit time (hereafter, referred to as "manual driving force TH") based on the output of the torque sensor 40.

The vehicle speed sensor 42 is coupled to a front fork. The vehicle speed sensor 42 outputs a value corresponding to a change in the position relative to a magnet attached to a spoke of a front wheel and transmits the value to the electronic control unit 12. Preferably, the vehicle speed sensor 42 includes a magnetic reed forming a reed switch or a Hall element. The electronic control unit 12 calculates a traveling distance per unit time (hereafter, referred to as "vehicle speed V") based on the output of the vehicle speed sensor 42 and the circumferential length of the front wheel, which is stored in the electronic control unit 12 in advance. The vehicle speed sensor 42 can be coupled to a chainstay of the bicycle. In this case, the magnet is attached to a spoke of a rear wheel. The vehicle speed sensor 42 can include a receiver of a global positioning system (UPS).

The inclination sensor 44 is coupled to a frame of the bicycle. The inclination sensor 44 is configured to detect an inclination of the bicycle. The inclination sensor 44 includes a three-axis gyroscope 44A and a three-axis acceleration sensor 44B. An output of the inclination sensor 44 includes information of the position angle with respect to each of the three axes and the acceleration with respect to each of the three axes. The position angles of the three axes include a pitch angle DA, a roll angle DB and a yaw angle DC. It is preferred that the three axes of the gyroscope 44A conform to the three axes of the acceleration sensor 44B. It is preferred that the inclination sensor 44 be coupled to the bicycle so that the lateral direction of the bicycle substantially conforms to the direction in which the axis for the pitch angle DA extends. The inclination sensor 44 can be coupled to the front fork, the handlebar or the drive unit 20. The inclination sensor 44 can include a one-axis acceleration sensor.

The electronic control unit 12 obtains information related to the inclination of bicycle from the inclination sensor 44, which detects the inclination of the bicycle in the front-rear direction. The electronic control unit 12 calculates an inclination D of the bicycle, for example, based on the output of the inclination sensor 44. The inclination D is the angle of the bicycle that is inclined in the front-rear direction about an axis extending in the lateral direction of the bicycle. More specifically, the inclination D is the pitch angle DA. The inclination D is set to be 0° in a state where the bicycle is located at a horizontal position. Thus, the inclination D is correlated with the gradient of a road on which the bicycle travels.

The electronic control unit 12 obtains information related to a vibration amount VR of the bicycle from a vibration sensor, which is configured to detect the vibration of the bicycle. One example of the vibration sensor is the acceleration sensor 44B. One example of the vibration amount VR is a vibration level (dB). The control unit 12 calculates the vibration amount VR of the bicycle, for example, based on the output of the acceleration sensor 44B. Preferably, the electronic control unit 12 calculates the vibration amount VR in the vertical direction of the bicycle.

The electronic control unit 12 executes assist control that controls the motor 24 based on the manual driving force TH and the vehicle speed V. The electronic control unit 12 stops driving the motor 24 in a state where the vehicle speed V is greater than or equal to a predetermined vehicle speed V. The predetermined vehicle speed V is, for example, 25 km per hour. The electronic control unit 12 calculates a torque instruction value for the output torque of the motor 24. The torque instruction value is set, for example, based on a value obtained by multiplying a predetermined assist ratio R by the manual driving force TH. The electronic control unit 12 further configured to control the motor 24 so that an output torque TA of the motor 24 is less than or equal to a predetermined upper limit value TL. The electronic control unit 12 further configured to control, for example, current supplied to the motor 24 so that the output torque TA of the motor 24 conforms to the torque instruction value. In a state where the torque instruction value is greater than the upper limit value TL, the electronic control unit 12 sets the torque instruction value to the upper limit value TL. The electronic control unit 12 can use a current instruction value or an electric power instruction value instead of the torque instruction value. The assist ratio R is a ratio of driving power of the motor 24 to the manual driving force TH. In a case that a reduction gear is connected to the motor 24, the assist ratio R is a ratio of driving power that is output from the reduction gear of the motor 24 relative to the manual driving force TH. In this case, it is preferred that the output torque TA of the motor 24 be the output torque of the reduction gear of the motor 24.

The operation modes include a first operation mode and a second operation mode, which control the output of the motor 24 based on the manual driving force, and another mode excluding the first operation mode and the second operation mode. The other mode includes, for example, a third operation mode that controls the output of the motor 24 based on the manual driving force. The electronic control unit 12 is further configured to control the motor 24 in any one of the first operation mode, the second operation mode and the third operation mode. Another example of the other operation mode further configured to control the output of the motor 24 regardless of the manual driving force. In one example, the other operation mode includes an off mode that stops the assist performed by the motor 24 and a walk mode in which the motor 24 assists the user when walking the bicycle. The other operation mode does not have to include the walk mode.

The first operation mode reduces the power consumed by the battery 50 when the bicycle is ridden. The second operation mode is designed for a situation in which the bicycle is ridden on a road surface where the riding load changes greatly like when on an off-road terrain including rocks and dirt and having large irregularities. In the preferred embodiment, the other or third operation mode is designed for a situation in which the bicycle is ridden on a road surface where the riding load continuously remains high like when climbing an uphill gradient such as a steep slope. The riding load is a force that is needed to move the bicycle and that acts in a tangential direction of tires of the bicycle and the road surface.

Each of the operation modes is associated with the assist ratio R and the upper limit value TL of the output torque TA. In the description hereafter, the electronic control unit 12 is further configured to set a first assist ratio R1 as the assist ratio R of the first operation mode, a second assist ratio R2 as the assist ratio R of the second operation mode, and a third assist ratio R3 as the assist ratio R of the third operation mode.

The electronic control unit 12 is further configured to set the second assist ratio R2 to be greater than the first assist ratio R1. The electronic control unit 12 is further configured to set the third assist ratio R3 to be greater than the second assist ratio R2. The electronic control unit 12 is further configured to set an increase rate (R2/R1) of the assist ratio R in a state where the first operation mode is switched to the second operation mode to be less than an increase rate (R3/R2) of the assist ratio R in a state where the second operation mode is switched to the third operation mode. Preferably, the third assist ratio R3 is 2 times or more than the second assist ratio R2. Preferably, the second assist ratio R2 is 2 times more than the first assist ratio R1. Preferably, the increase rate (R2/R1) of the assist ratio R in a state where the first operation mode is switched to the second operation mode is less than one-half of the increase ratio (R3/R2) of the assist ratio R in a state where the second operation mode is switched to the third operation mode.

The assist ratios R1 to R3 are set to, for example, values in the numerical ranges described below under a condition that satisfies the above relationships. More specifically, the assist ratio R1 is 0.5 or greater and 0.65 or less, and preferably 0.6. The assist ratio R2 is 0.65 or greater and less than 1.8, and preferably 0.7. The assist ratio R3 is 2.5 or greater and 4.0 or less, and preferably 3.0.

In the first operation mode, the electronic control unit 12 is further configured to set the upper limit value of the output torque of the motor 24 as a first upper limit value TL1. In the second operation mode, the electronic control unit 12 is further configured to set the upper limit value of the output torque of the motor 24 as a second upper limit value TL2, which is 1.5 times or more than the first upper limit value TL1. Preferably, the electronic control unit 12 is further configured to set the second upper limit value TL2 to be 2 times or more than the first upper limit value TL1. In the other operation mode, the electronic control unit 12 is further configured to set the upper limit value of the output torque of the motor 24 as the first upper limit value TL1 or less, or the second upper limit value TL2 or greater. Preferably, the other operation mode includes the third operation mode in which the upper limit value of the output torque of the motor 24 is greater than or equal to the second upper limit value TL2. The electronic control unit 12 is further configured to set a difference between a third upper limit value TL3 and the second upper limit value TL2 to be less than the difference between the second upper limit value TL2 and the first upper limit value TL1. Preferably, the electronic control unit 12 is further configured to set the third upper limit value TL3 to be equal to the second upper limit value TL2.

The increase rate (TL1/TL2) of the upper limit value TL of the output torque TA of the motor 24 in a state where the first operation mode is switched to the second operation mode is greater than the increase rate (TL3/TL2) of the upper limit value TL of the output torque TA of the motor 24 in a state where the second operation mode is switched to the third operation mode. Preferably, the increase rate (TL1/TL2) of the upper limit value TL of the output torque TA of the motor 24 in a state where the first operation mode is switched to the second operation mode is greater than one-half of the increase rate (TL3/TL2) of the upper limit value TL of the output torque TA of the motor 24 in a state where the second operation mode is switched to the third operation mode.

The upper limit values TL1 to TL3 are set, for example, to values in the numerical ranges described below under a condition that satisfies the above relationships. More specifically, the first upper limit value TL1 is 20 Nm or greater and 35 Nm or less, and preferably 30 Nm. The second upper limit value TL2 is greater than 55 Nm and 70 Nm or less, and preferably 70 Nm. The third upper limit value TL3 is 60 Nm or greater and 80 Nm or less, and preferably 70 Nm.

In the first operation mode, the electronic control unit 12 is further configured to control the motor 24 to obtain the first assist ratio R1 in a state where the output torque TA of the motor 24 is less than or equal to the first upper limit value TL1. In the second operation mode, the electronic control unit 12 is further configured to control the motor 24 to obtain the second assist ratio R2 in a state where the output torque TA of the motor 24 is less than or equal to the second upper limit value TL2. In the third operation mode, the electronic control unit 12 is further configured to control the motor 24 to obtain the third assist ratio R3 in a state where the output torque TA of the motor 24 is less than or equal to the third upper limit value TL3.

The electronic control unit 12 switches the operation mode based on at least one of the inclination of the bicycle and the vibration of the bicycle. In a state where the inclination D is less than a first angle Y1 and the vibration amount VR is less than a threshold value X, the electronic control unit 12 controls the motor 24 in the first operation mode. In a state where the inclination D is less than the first angle Y1 and the vibration amount VR is greater than or equal to the threshold value X, the electronic control unit 12 controls the motor 24 in the second operation mode. In a state where the inclination D is greater than or equal to the first angle Y1, the electronic control unit 12 controls the motor 24 in the third operation mode. The first angle Y1, which is preset through tests or the like, is a value that determines whether or not the road surface applies a high riding load such as a steep slope. The threshold value X, which is preset through tests or the like, is a value that determines whether the road surface is on-road or off-road. The on-road surface refers to a surface of, for example, a paved road that has small irregularities and applies a small riding load.

The electronic control unit 12 is programmed or configured to execute a switching process that switches the operation mode to one of the first operation mode, the second operation mode, and the third operation mode based on the inclination D and the vibration amount VR. Thus, the output of the motor 24 is controlled in the operation mode that is appropriate to the road surface in accordance with the riding environment.

The switching process will now be described with reference to FIGS. 1 and 2. The electronic control unit 12 repeatedly executes the switching process in a predetermined cycle. The electronic control unit 12 terminates the execution of the switching process in a case that a signal for manually changing the operation modes is received from the operation unit 30 or the supply of power to the electronic control unit 12 is stopped.

In step S11, the electronic control unit 12 determines whether or not the vibration amount VR is greater than or equal to the threshold value X. In a case that the electronic control unit 12 determines in step S11 that the vibration amount YR is greater than or equal to the threshold value X, the electronic control unit 12 proceeds to step S12 and determines whether or not the inclination D is the greater than or equal to the first angle Y1.

In a case that the electronic control unit 12 determines in step S12 that the inclination D is greater than or equal to the first male Y1, the electronic control unit 12 proceeds to step S13 and controls the motor 24 in the third operation mode. In a case that the electronic control unit 12 determines in step S12 that the inclination D is less than the first angle Y1, the electronic control unit 12 proceeds to step S14 and controls the motor 24 in the second operation mode.

In a case that the electronic control unit 12 is programmed to determine in step S11 that the vibration amount VR is less than the threshold value X, the electronic control unit 12 proceeds to step S15, and programmed to determine whether or not the inclination D is less than the first angle Y1. In a case that the electronic control unit 12 determines in step S15 that the inclination D is less than the first angle Y1, the electronic control unit 12 proceeds to step S16 and controls the motor 24 in the first operation mode. In a case that the electronic control unit 12 determines in step S15 that the inclination D is greater than or equal to the first angle Y1, the electronic control unit 12 proceeds to step S13 and controls the motor 24 in the third operation mode.

Modified Examples

The above description illustrates one embodiment of the bicycle controller according to the present invention and is not intended to be restrictive. The bicycle controller of the present invention can be modified as follows. Further, two or more modified examples can be combined.

In the switching process, the electronic control unit 12 can control the motor 24 in the corresponding one of the operation modes based on only the inclination D. In one example, in a state where the inclination D is greater than or equal to a second angle Y2, the electronic control unit 12 controls the motor 24 in the third operation mode. In a state where the inclination D is greater than or equal to a third angle Y3, which is smaller than the second angle Y2, and the inclination D is less than the second angle Y2, the electronic control unit 12 controls the motor 24 in the second operation mode. In a state where the inclination D is less than the third angle Y3, the electronic control unit 12 controls the motor 24 in the first operation mode. The second angle Y2, which is preset through tests or the like, is a value that determines whether or not the road surface on which the bicycle is traveling is in a high riding load state and, for example, a steep slope. The second angle Y2 is, for example, equal to the first angle Y1 of the embodiment. The third angle Y3 is a value that determines whether or not the road surface on which the bicycle is traveling is in a low riding load state and, for example, flat. The third angle Y3 is preset through tests or the like.

The modified example of the switching process will now be described with reference to FIG. 3.

In step S21, the electronic control unit 12 determines whether or not the inclination D is greater than or equal to the second angle Y2. In a case that the electronic control unit 12 determines in step S21 that the inclination D is greater than or equal to the second angle Y2, the electronic control unit 12 proceeds to step S22 and controls the motor 24 in the third operation mode. In a case that the electronic control unit 12 determines in step S21 that the inclination D is less than the second angle Y2, the electronic control unit 12 proceeds to step S23 and determines whether or not the inclination D is greater than or equal to the third angle Y3.

In a case that the electronic control unit 12 determines in step S23 that the inclination D is greater than or equal to the third angle Y3, the electronic control unit 12 proceeds to step S24 and controls the motor 24 in the second operation mode. In a case that the electronic control unit 12 determines in step S23 that the inclination D is less than the third angle Y3, the electronic control unit 12 proceeds to step S25 and controls the motor 24 in the first operation mode.

In another modified example, the electronic control unit 12 is further configured to control the motor 24 in the third operation mode in a state where the inclination D of the bicycle is greater than or equal to a fourth angle Y4, and in the second operation mode in a state where the inclination D is less than the fourth angle Y4. The fourth angle Y4 is a value that determines whether or not the road surface on which the bicycle is traveling is in a high riding load state and, for example, a steep slope. The fourth angle Y4 is preset through tests or the like. The fourth angle Y4 is, for example, equal to the first angle Y1 of the embodiment.

In this modified example, the electronic control unit 12 switches the operation mode to the second operation mode or the third operation mode based on the inclination. In a case that the electronic control unit 12 controls the motor 24 in this manner, the operation mode is switched to the first operation mode based on an operation of the operation unit 30 that is operable by the user. For example, in a case that the user operates the first operation part 32, the operation unit 30 transmits a switching control for switching to the first operation mode to the electronic control unit 12. The electronic control unit 12 is further configured to control the motor 24 in the first operation mode based on the switching signal.

Figure 4:
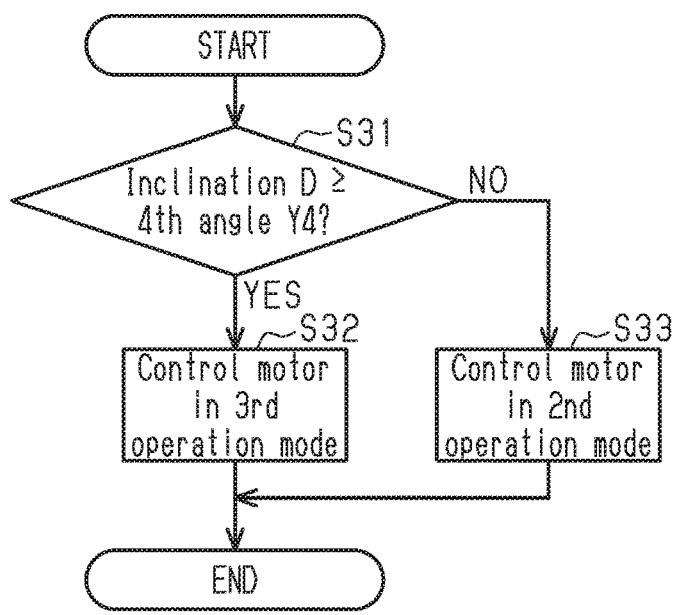
FIG. 4 is a flowchart of a switching process executed by a second modified example of an electronic control unit.

The modified example of the switching process will now be described with reference to FIG. 4.

In step S31, the electronic control unit 12 determines whether or not the inclination D is greater than or equal to the fourth angle Y4. In a case that the electronic control unit 12 determines in step S31 that the inclination D is greater than or equal to the fourth angle Y4, the electronic control unit 12 proceeds to step S32 and controls the motor 24 in the third operation mode. In a case that the electronic control unit 12 determines in step S31 that the inclination D is less than the fourth angle Y4, the electronic control unit 12 proceeds to step S33 and controls the motor 24 in the second operation mode.

In the switching process, the electronic control unit 12 can control the motor 24 in the corresponding one of the operation modes based on only the vibration of the bicycle. In one example, the electronic control unit 12 controls the motor 24 in the second operation mode in a state where the vibration amount VR of the bicycle is greater than or equal to the threshold value X, and in the first operation mode in a state where the vibration amount VR is less than the threshold value X. In this example, the electronic control unit 12 switches the operation mode to the first operation mode or the second operation mode based on the vibration amount VR. In a case that the electronic control unit 12 controls the motor 24 in this manner, the operation mode is switched to the third operation mode based on an operation of the operation unit 30 that is operable by the user. For example, in a case that the user operates the first operation part 32, the operation unit 30 transmits a switching signal for switching to the third operation mode to the electronic control unit 12. The electronic control unit 12 is further configured to control the motor 24 in the third operation mode based on the switching signal.

Figure 5:
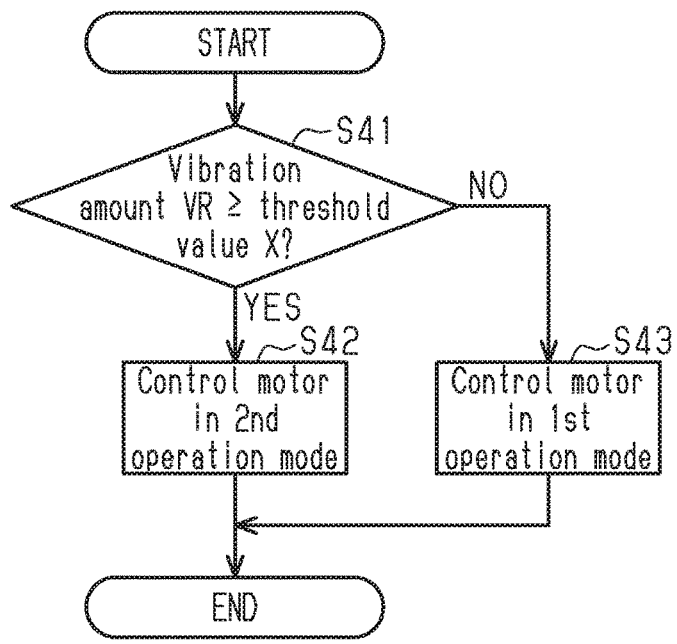
FIG. 5 is a flowchart of a switching process executed by a third modified example of an electronic control unit.

The modified example of the switching process will now be described with reference to FIG. 5.

In step S41, the electronic control unit 12 determines whether or not the vibration amount VR is greater than or equal to the threshold value X. In a case that the electronic control unit 12 determines in step S41 that the vibration amount VR is greater than or equal to the threshold value X, the electronic control unit 12 proceeds to step S42 and controls the motor 24 in the second operation mode. In a case that the electronic control unit 12 determines in step S41 that the vibration amount VR is less than the threshold value X, the electronic control unit 12 proceeds to step S43 and controls the motor 24 in the first operation mode.

Figure 6:
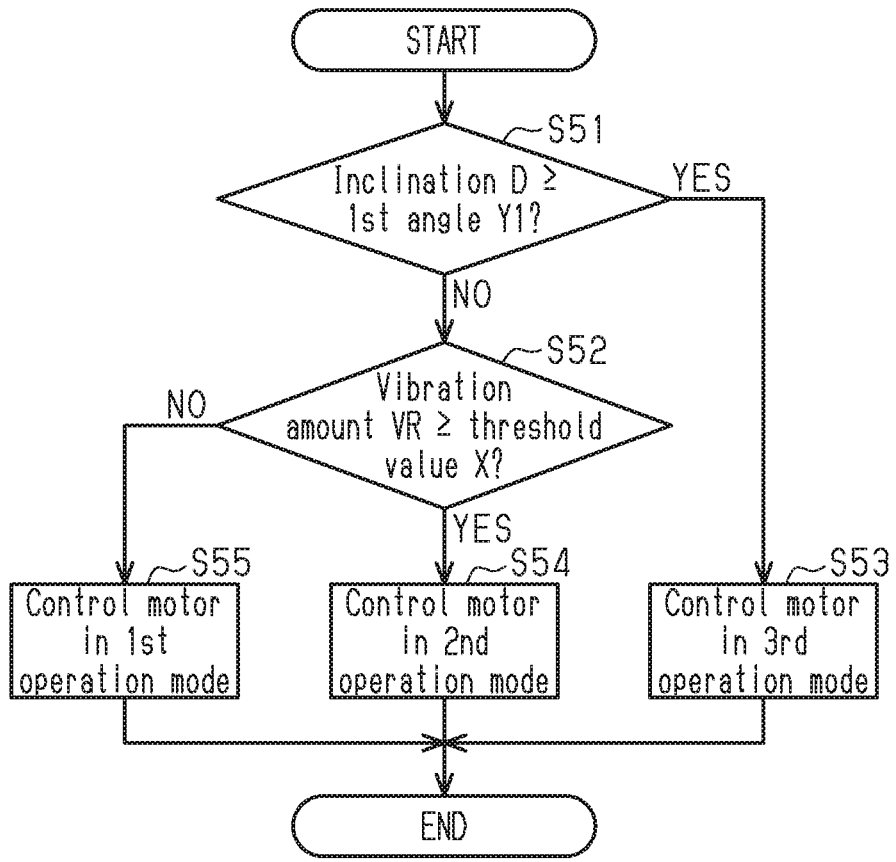
FIG. 6 is a flowchart of a switching process executed by a fourth modified example of an electronic control unit.

As shown in FIG. 6, in the switching process, after determining in step S51 whether or not the inclination D is greater than or equal to the first angle Y1, the electronic control unit 12 can proceed to step S52 and determines whether or not the vibration amount VR is greater than or equal to the threshold value X. For example, in a case that the electronic control unit 12 determines in step S51 that the inclination D is greater than or equal to the first angle Y1, the electronic control unit 12 proceeds to step S53 and controls the motor 24 in the third operation mode. More specifically, in a case that the electronic control unit 12 determines that the inclination D is greater than or equal to the first angle Y1, the electronic control unit 12 does not perform determination of whether or not the vibration amount VR is greater than or equal to the threshold value X. In a case that the electronic control unit 12 determines in step S51 that the inclination D is less than the first angle Y1, the electronic control unit 12 proceeds to step S52 and determines whether or not the vibration amount VR is greater than or equal to the threshold value X. In a case that the electronic control unit 12 determines in step S52 that the vibration amount VR is greater than or equal to the threshold value X, the electronic control unit 12 proceeds to step S54 and controls the motor 24 in the second operation mode. In a case that the electronic control unit 12 determines in step S52 that the vibration amount VR is less than the threshold value X, the electronic control unit 12 proceeds to step S55 and controls the motor 24 in the first operation mode.

In a state where the front wheel of the bicycle separates from the road surface, the electronic control unit 12 can control the motor 24 in the first operation mode or the second operation mode regardless of the switching process. The electronic control unit 12 determines that the front wheel of the bicycle is separated from the road surface, for example, in a state where the inclination D is a predetermined angle YA. The predetermined angle YA is an inclination corresponding to the separation of the front wheel and, for example, 45°. The predetermined angle YA is greater than the first angle Y1. Preferably, the predetermined angle YA is set to be greater than the gradient of a typical uphill slope. Alternatively, the electronic control unit 12 can determine that the front wheel of the bicycle is separated from the road surface, for example, in a state where the inclination D is greater than or equal to the predetermined YA and a changing speed DV of the inclination D is greater than or equal to a predetermined speed VX. Preferably, the changing speed DV is set to be greater than a changing speed of the inclination D of the bicycle that is traveling a typical uphill slope. Alternatively, the control unit 12 can determine that the front wheel of the bicycle is separated from the road surface, for example, in a state where the inclination D is greater than or equal to the predetermined angle YA and a load W applied to the front wheel is less than a predetermined load WX. The predetermined load WX is set to a value that detects the separation of the front wheel. The predetermined load WX is set to be, for example, 0 kg or a value that is proximate to 0 kg.

The assist ratios R1 to R3 can be set to any values. For example, the first assist ratio R1 can be equal to the second assist ratio R2. The second assist ratio R2 can be equal to the third assist ratio R3. The first assist ratio R1, the second assist ratio R2, and the third assist ratio R3 can be equal to one another. The assist ratios R1 to R3 and the upper limit value of the output torque TA for each operation mode can be set by the user using an electronic device or an operation device that is connected to the bicycle controller 10. The electronic device includes a personal computer (PC) and a smartphone.

The electronic control unit 12 can obtain the inclination D using a global positioning system (GPS) Information of the inclination D is input from the GPS to the electronic control unit 12, for example, through a cycle computer or a smartphone. Alternatively, the user can input the inclination D into the electronic control unit 12.

The electronic control unit 12 can calculate the vibration amount VR based on the output of a vibration sensor that is coupled to the bicycle separately from the inclination sensor 44. The vibration sensor can be realized, for example, with an acceleration sensor, a speed sensor, or a displacement sensor.

The operation unit 30 can include buttons corresponding to the operation modes instead of the first operation part 32 and the second operation part 34. In a case that the user operates one of the buttons, the operation unit 30 transmits a switching signal that switches to the operation mode corresponding to the button to the electronic control unit 12. The electronic control unit 12 is further configured to control the motor 24 in the operation mode corresponding to the switching signal.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle controller comprising:
   an electronic control unit configured to control an output of a motor that assists in propelling of a bicycle based on a manual driving force that is input to the bicycle,
   the electronic control unit being further configured to control the motor in any one of a plurality of operation modes that includes a first operation mode and a second operation mode, the first and second operation modes controlling the output of the motor based on the manual driving force,
   in the first operation mode, the electronic control unit is further configured to set a first upper limit value of an output torque of the motor,
   in the second operation mode, the electronic control unit is further configured to set a second upper limit value, that is 1.5 times or more than the first upper limit value of the output torque of the motor, and
   the electronic control unit being, further configured to control the motor in a other operation mode that excludes the first and second operation modes, in the other operation mode, the electronic control unit is further configured to set a third upper limit value of the output torque of the motor to one of the first upper limit value or less and the second upper limit value or greater.

2. The bicycle controller according to claim 1, wherein the second upper limit value is 2 times or more than the first upper limit value.

3. The bicycle controller according to claim 1, wherein in the first operation mode, the electronic control unit is further configured to control the motor to obtain a first assist ratio in a state where the output torque of the motor is less than or equal to the first upper limit value, and
   in the second operation mode, the electronic control unit is further configured to control the motor to obtain a second assist ratio in a state where the output torque of the motor is less than or equal to the second upper limit value.

4. The bicycle controller according to claim 3, wherein the second assist ratio is 2 times or less than the first assist ratio.

5. The bicycle controller according to claim 3, wherein the other operation mode, the electronic control unit is further configured to set the other operation as a third operation mode in which the third upper limit value of the output torque of the motor to be greater than or equal to the second upper limit value,
   in the third operation mode, the control unit is further configured to control the motor to obtain a third assist ratio in a state where the output torque of the motor is less than or equal to the third upper limit value,
   the third assist ratio is greater than the second assist ratio of the second operation mode, and
   a difference between the third upper limit value and the second upper limit value is less than a difference between the second upper limit value and the first upper limit value.

6. The bicycle controller according to claim 5, wherein the third assist ratio is 2 times or more than the second assist ratio.

7. The bicycle controller according to claim 5, wherein the third upper limit value is equal to the second upper limit value.

8. The bicycle controller according to claim 5, wherein
the electronic control unit is further configured to control the motor in the third operation mode in a state where an inclination of the bicycle is greater than or equal to a second angle,
the electronic control unit is further configured to control the motor in the second operation mode in a state where the inclination is greater than or equal to a third angle, which is smaller than the second angle, and less than the second angle, and
the electronic control unit is further configured to control the motor in the first operation mode in a state where the inclination is less than the third angle.

9. The bicycle controller according to claim 5, wherein
the electronic control unit is further configured to control the motor in the third operation mode in a state where an inclination of the bicycle is greater than or equal to a fourth angle, and
the electronic control unit is further configured to control the motor in the second operation mode in a state where the inclination is less than the fourth angle.

10. The bicycle controller according to claim 9, wherein the electronic control unit is configured to switch the operation modes to the first operation mode based on an operation of an operation unit that is operable by a user.

11. The bicycle controller according to claim 1, wherein the electronic control unit is further configured to change the operation modes based on an operation of a bicycle operation unit that is operable by a user.

12. The bicycle controller according to claim 1, wherein the electronic control unit is further configured to switch the operation modes based on at least one of an inclination of the bicycle and a vibration of the bicycle.

13. The bicycle controller according to claim 12, wherein the electronic control unit is further configured to control the motor in the first operation mode in a state where the inclination is less than a first angle and an amount of the vibration is less than a threshold value.

14. The bicycle controller according to claim 12, wherein
the electronic control unit is further configured to control the motor in the second operation mode in a state where the inclination angle is less than a first angle and an amount of the vibration is greater than or equal to a threshold value.

15. The bicycle controller according to claim 12, wherein
the third operation mode has the upper limit value of the output torque of the motor is a third upper limit value, which is greater than or equal to the second upper limit value,
in the third operation mode, the control unit is further configured to control the motor to obtain a third assist ratio in a state where the output torque of the motor is less than or equal to the third upper limit value,
the third assist ratio is greater than the second assist ratio of the second operation mode,
a difference between the third upper limit value and the second upper limit value is less than a difference between the second upper limit value and the first upper limit value, and
the electronic control unit is further configured to control the motor in the third operation mode in a state where the inclination is greater than or equal to a first angle.

16. The bicycle controller according to claim 12, wherein
the electronic control unit is further configured to control the motor in the second operation mode in a state where an amount of vibration of the bicycle is greater than or equal to a threshold value, and
the electronic control unit is further configured to control the motor in the first operation mode in a state where the amount of the vibration is less than the threshold value.

17. The bicycle controller according to claim 16, wherein
the third operation mode has the upper limit value of the output torque of the motor is a third upper limit value, which is greater than or equal to the second upper limit value,
in the third operation mode, the control unit is further configured to control the motor to obtain a third assist ratio in a state where the output torque of the motor is less than or equal to the third upper limit value,
the third assist ratio is greater than the second assist ratio of the second operation mode,
a difference between the third upper limit value and the second upper limit value is less than a difference between the second upper limit value and the first upper limit value, and
the electronic control unit is configured to switch the operation modes to the third operation mode based on an operation of a bicycle operation unit that is operable by a user.

18. The bicycle controller according to claim 12, wherein the electronic control unit is configured to obtain information related to the inclination from an inclination sensor that detects an inclination of the bicycle in a front-rear direction.

19. The bicycle controller according to claim 12, wherein the electronic control unit is configured to obtain information related to an amount of the vibration from a vibration sensor that detects vibration of the bicycle.

20. A bicycle controller comprising:
an electronic control unit configured to control an output of a motor that assists in propelling of a bicycle based on a manual driving force that is input to the bicycle,
the electronic control unit being further configured to control the motor in any one of operation modes including a first operation mode, a second operation mode and a third operation mode,
the electronic control unit being further configured to set an increase rate of an assist ratio in a state where the first operation mode is switched to the second operation mode to be less than an increase rate of an assist ratio in a state where the second operation mode is switched to the third operation mode, and
the electronic control unit being further configured to set an increase rate of an upper limit value of an output torque of the motor in a state where the first operation mode is switched to the second operation mode to be greater than an increase rate of an upper limit value of the output torque of the motor in a state where the second operation mode is switched to the third operation mode.

21. The bicycle controller according to claim 20, wherein the assist ratio of the second operation mode is 2 times or more than the assist ratio of the first operation mode.

22. The bicycle controller according to claim 20, wherein the upper limit value of the output torque of the motor in the second operation mode is 2 times or more than the upper limit value of the output torque of the motor in the first operation mode.

* * * * *